United States Patent
Park et al.

(10) Patent No.: US 11,394,915 B2
(45) Date of Patent: Jul. 19, 2022

(54) IMAGE SENSING DEVICE AND OPERATING METHOD THEREOF

(71) Applicant: SK hynix Inc., Gyeonggi-do (KR)

(72) Inventors: Yu Jin Park, Gyeonggi-do (KR); Nam Ryeol Kim, Gyeonggi-do (KR); Kang Bong Seo, Gyeonggi-do (KR); Sung Uk Seo, Gyeonggi-do (KR); Jung Soon Shin, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/023,008

(22) Filed: Sep. 16, 2020

(65) Prior Publication Data

US 2021/0314511 A1    Oct. 7, 2021

(30) Foreign Application Priority Data

Apr. 3, 2020 (KR) .................... 10-2020-0040931

(51) Int. Cl.
*H04N 5/378* (2011.01)
*H04N 5/355* (2011.01)
(Continued)

(52) U.S. Cl.
CPC ........... *H04N 5/378* (2013.01); *H04N 5/2175* (2013.01); *H04N 5/359* (2013.01); *H04N 5/3559* (2013.01); *H04N 5/374* (2013.01)

(58) Field of Classification Search
CPC .. H04N 5/31568; H04N 5/359; H04N 5/3591; H04N 5/3592; H04N 5/3594;
(Continued)

(56) References Cited

U.S. PATENT DOCUMENTS 7,157,685 B2    1/2007 Bamji et al.
7,176,438 B2    2/2007 Bamji et al.
(Continued)

FOREIGN PATENT DOCUMENTS

KR    10-2016-0021591    2/2016
KR    10-2019-0081591    7/2019

OTHER PUBLICATIONS

Bamji et al., 1Mpixel 65nm BSI 320MHz Demodulated TOF Image Sensor with 3.5 μm Global Shutter Pixels and Analog Binning, ISSCC 2018, Feb. 2018, p. 94-p. 95, IEEE, San Francisco, CA, USA.
(Continued)

*Primary Examiner* — Lin Ye
*Assistant Examiner* — Chriss S Yoder, III
(74) *Attorney, Agent, or Firm* — IP & T Group LLP

(57) ABSTRACT

Disclosed are an image sensing device and an operating method thereof, and the image sensing device may include a charge sensing element suitable for generating first charges, which correspond to incident light, based on a photo control signal; a reset element suitable for resetting the charge sensing element based on a reset signal; a floating diffusion node suitable for accumulating the first charges; a compensation element suitable for selectively supplying a compensation current to the floating diffusion node based on a compensation control signal; and a selection element suitable for outputting a pixel signal, which corresponds to a voltage on the floating diffusion node, to a readout line based on a selection signal.

18 Claims, 5 Drawing Sheets

(51) Int. Cl.
*H04N 5/374* (2011.01)
*H04N 5/217* (2011.01)
*H04N 5/359* (2011.01)

(58) Field of Classification Search
CPC .. H04N 5/374; H04N 5/3745; H04N 5/37455;
H04N 5/378; H04N 5/2175; H04N
5/3559; H04N 5/357; H04N 5/3741
See application file for complete search history.

(56) References Cited

U.S. PATENT DOCUMENTS

| | | | |
|---|---|---|---|
| 7,321,111 | B2 | 1/2008 | Bamji et al. |
| 7,507,947 | B2 | 3/2009 | Bamji et al. |
| 8,476,567 | B2* | 7/2013 | De Wit ............ H04N 5/37452 250/208.1 |
| 8,648,998 | B2 | 2/2014 | Van Nieuwenhove et al. |
| 9,973,717 | B1* | 5/2018 | Dharia ............ H01L 27/14643 |
| 10,027,910 | B2 | 7/2018 | Bulteel et al. |
| 2003/0112351 | A1* | 6/2003 | Clark ............ H04N 5/3535 348/307 |
| 2010/0026838 | A1* | 2/2010 | Belenky ............ H04N 5/35536 348/229.1 |
| 2014/0160461 | A1* | 6/2014 | Van Der Tempel .. G01S 7/4865 356/5.01 |
| 2014/0267859 | A1* | 9/2014 | Wang ............ H04N 5/372 348/308 |
| 2017/0034464 | A1* | 2/2017 | Dielacher ......... H04N 5/37452 |

OTHER PUBLICATIONS

Cho et al., A 3-D Camera With Adaptable Background Light Suppression Using Pixel-Binning and Super-Resolution, IEEE Journal of Solid-State Circuits, Oct. 2014, p. 2319-p. 2332, vol. 49, IEEE.

Bamji et al., A 0.13 µm CMOS System-on-Chip for a 512×424 Time-of-Flight Image Sensor With Multi-Frequency Photo-Demodulation up to 130 MHz and 2 GS/s ADC, IEEE Journal of Solid-State Circuits, Jan. 2015, p. 303-p. 319, vol. 50, IEEE.

Hsu et al., A CMOS Time-of-Flight Depth Image Sensor With In-Pixel Background Light Cancellation and Phase Shifting Readout Technique, IEEE Journal of Solid-State Circuits, Oct. 2018, p. 2898-p. 2905, vol. 53, IEEE.

Kato et al., 320×240 Back-Illuminated 10-µm CAPD Pixels for High-Speed Modulation Time-of-Flight CMOS Image Sensor, IEEE Journal of Solid-State Circuits, Apr. 2018, p. 1071-p. 1078, vol. 53, IEEE.

Park et al., A 64×64 APD-Based ToF Image Sensor with Background Light Suppression up to 200 klx Using In-Pixel Auto-Zeroing and Chopping, 2019 Symposium on VLSI Circuits Digest of Technical Papers, Jun. 2019, pp. C256-C257, IEEE, Kyoto, Japan.

* cited by examiner

IMAGE SENSING DEVICE AND OPERATING METHOD THEREOF

CROSS-REFERENCE TO RELATED APPLICATION (S)

This application claims priority under 35 U.S.C. § 119 to Korean Patent Application No. 10-2020-0040931, filed on Apr. 3, 2020, the disclosure of which is incorporated herein by reference in its entirety.

BACKGROUND

1. Field

Various embodiments of the present disclosure relate to a semiconductor design technique, and more particularly, to an image sensing device and an operating method thereof.

2. Description of the Related Art

Image sensing devices capture images using the property of a semiconductor, which reacts to light. Image sensing devices may be roughly classified into charge-coupled device (CCD) image sensing devices and complementary metal-oxide semiconductor (CMOS) image sensing devices. Recently, CMOS image sensing devices are widely used because the CMOS image sensing devices allow both analog and digital control circuits to be directly implemented on a single integrated circuit (IC).

SUMMARY

Various embodiments of the present disclosure are directed to an image sensing device for removing background light, and an operating method of the image sensing device.

In addition, various embodiments of the present disclosure are directed to an image sensing device in which a circuit for removing the background light is designed to be excluded as much as possible from a region where a pixel is disposed, and an operating method of the image sensing device.

In accordance with an embodiment, an image sensing device may include: a charge sensing element suitable for generating first charges, which correspond to incident light, based on a photo control signal; a reset element suitable for resetting the charge sensing element based on a reset signal; a floating diffusion node suitable for accumulating the first charges; a compensation element suitable for selectively supplying a compensation current to the floating diffusion node based on a compensation control signal; and a selection element suitable for outputting a pixel signal, which corresponds to a voltage on the floating diffusion node, to a readout line based on a selection signal.

The compensation element may selectively couple the floating diffusion node to a global bias line based on the compensation control signal.

The compensation control signal may indicate whether the floating diffusion node is saturated.

In accordance with an embodiment, an image sensing device may include: at least one pixel suitable for generating an analog pixel signal, which corresponds to reflected light that remains after background light of incident light is removed, based on a compensation control signal, the reflected light being reflected from a subject; a signal converter suitable for converting the analog pixel signal into a digital pixel signal; and a compensation controller suitable for generating the compensation control signal based on the digital pixel signal.

The pixel may include: a charge sensing element suitable for generating first charges, which correspond to the incident light, based on a photo control signal; a floating diffusion node suitable for accumulating the first charges; a compensation element suitable for selectively supplying a compensation current, which corresponds to the background light, to the floating diffusion node based on a compensation control signal; and a selection element suitable for outputting a pixel signal, which corresponds to a voltage on the floating diffusion node, to a readout line based on a selection signal.

The compensation control signal may indicate whether the floating diffusion node in the pixel is saturated.

The compensation controller may compensate for a pixel signal to be generated during a current frame period, based on the digital pixel signal generated during a previous frame period.

In accordance with an embodiment, an operating method of an image sensing device may include: determining, during a first frame period, whether at least one depth sensing pixel is saturated, based on a pixel signal read out from the depth sensing pixel; storing, during the first frame period, compensation information of the depth sensing pixel determined to be saturated; and removing, during a second frame period after the first frame period, background light from the depth sensing pixel based on the compensation information.

The determining may include: converting the pixel signal, as an analog signal, into a digital pixel signal; comparing the digital pixel signal with a reference signal; and determining whether the depth sensing pixel is saturated, according to the comparison result.

The removing may include supplying a compensation current, which corresponds to the background light, to a floating diffusion node in the depth sensing pixel.

In accordance with an embodiment, an image sensing device may include: a pixel suitable for generating previous and current pixel signals reflected from a subject; a controller suitable for generating a compensation control signal indicating whether the pixel is saturated on a basis of the previous pixel signal, and a bias control signal representing a compensation value corresponding to a background light portion in the previous pixel signal; a generator suitable for generating a bias current in response to the bias control signal; and a processor suitable for generating depth information with respect to the subject based on the current pixel signal, wherein the pixel includes a compensation circuit suitable for compensating, in response to the compensation control signal, the saturation based on the bias current thereby removing the background light portion from the current pixel signal, and wherein the pixel is disposed in a different area than the controller and the generator.

DETAILED DESCRIPTION

Various embodiments are described below with reference to the accompanying drawings to enable those skilled in art to which the present disclosure pertains to practice and easily carry out the present invention. Throughout the specification, reference to "an embodiment," "another embodiment" or the like is not necessarily to only one embodiment, and different references to any such phrase are not necessarily to the same embodiment(s).

It will be understood that when an element is referred to as being "connected to" or "coupled to" another element, the element may be directly on, connected to or coupled to the another element, or one or more intervening elements may be present. In addition, it will also be understood that the terms "comprises," "comprising," "includes," and "including" when used herein, specify the presence of the stated elements and do not preclude the presence or addition of one or more other elements. In the description throughout the specification, some components are described in singular forms, but the present disclosure is not limited thereto, and it will be understood that the components may be formed in plural.

Figure 1:
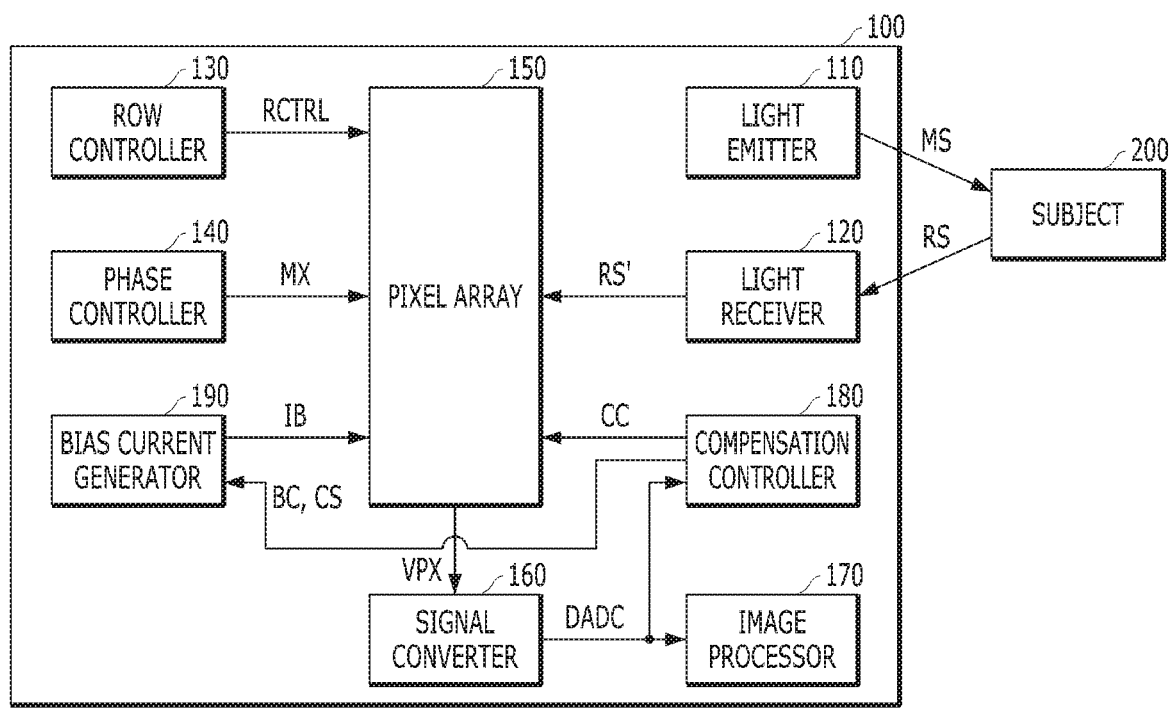
FIG. 1 is a block diagram illustrating an image sensing device in accordance with an embodiment.

FIG. 1 is a block diagram illustrating an image sensing device 100 in accordance with an embodiment.

Referring to FIG. 1, the image sensing device 100 may measure depth between itself and a subject 200 by means of a time of flight (ToF) method. For example, the image sensing device 100 may measure the depth by detecting a phase difference between light MS that is emitted from the image sensing device 100 toward the subject 200 and light RS that is received from the subject 200, and incident on, the image sensing device 100. The measured depth may be in the form, or part, of depth information.

For example, the image sensing device 100 may include a light emitter 110, a light receiver 120, a row controller 130, a phase controller 140, a pixel array 150, a signal converter 160, an image processor 170, a compensation controller 180 and a bias current generator 190.

The light emitter 110 may be enabled during an integration time, which represents a time period. The light emitter 110 may emit the emitted light MS to the subject 200 during the integration time. For example, the emitted light MS may be a periodic signal that periodically toggles.

The light receiver 120 may be enabled during the integration time. The light receiver 120 may receive incident light RS during the integration time, and transmit received incident light RS' to the pixel array 150. The incident light RS may include emitted light MS that is reflected from the subject 200 and received by the light receiver 120 and background light that is present on and/or near the periphery of the subject 200.

The row controller 130 may generate a plurality of row control signals RCTRL for controlling each row of the pixel array 150. For example, the row controller 130 may generate first row control signals for controlling pixels arranged in a first row of the pixel array 150, and generate $n^{th}$ row control signals for controlling pixels arranged in an $n^{th}$ row of the pixel array 150, where "n" is a natural number greater than 2.

The phase controller 140 may be enabled during the integration time. The phase controller 140 may generate a control signal MX that periodically toggles during the integration time. For example, the control signal MX may have the same phase and period as the emitted light MS. Although, by way of example, the present embodiment depicts an example in which one control signal MX is generated, the present invention is not necessarily limited thereto. In another embodiment, a plurality of control signals MX having different phases may be generated and used, depending on design.

The pixel array 150 may generate a plurality of pixel signals VPX based on the received incident light RS', the plurality of row control signals RCTRL, the control signal MX, a bias current IB and a compensation control signal CC. Each of the plurality of pixel signals VPX may correspond to the reflected light, which remains after the background light of the incident light RS is removed. Each of the plurality of pixel signals VPX may be an analog signal. The pixel array 150 may include a plurality of unit pixels, i.e., depth sensing pixels, for measuring the depth from the subject 200. For example, each of the unit pixels may be selected based on row control signals, allocated thereto, among the plurality of row control signals RCTRL, and generate one pixel signal VPX based on the control signal MX, the received incident light RS', the bias current IB and the compensation control signal CC. The unit pixels are described in more detail with reference to FIG. 2.

The signal converter 160 may convert the plurality of analog pixel signals VPX into a plurality of digital pixel signals DADC. For example, the signal converter 160 may include an analog-to-digital converter.

The image processor 170 may measure or calculate the depth based on the plurality of pixel signals DADC. Any known and suitable method of measuring the depth may be used.

The compensation controller 180 may generate a plurality of compensation control signals CC, at least one bias control signal BC and a plurality of selection control signals CS based on the plurality of pixel signals DADC. The plurality of compensation control signals CC may indicate whether a floating diffusion node included in each of the unit pixels is saturated. The number of compensation control signals CC generated may correspond to the number of unit pixels. The bias control signal BC and the plurality of selection control signals CS may be generated according to whether each of the unit pixels is saturated. For example, the bias control signal BC may be one signal that is used in common, and the number of selection control signals CS may be generated corresponding to the number of columns of the pixel array 150.

The compensation controller 180 may serve to correct the plurality of pixel signals DADC to be generated during a current frame period, by using the plurality of pixel signals DADC generated during a previous frame period. The compensation controller 180 is described in more detail with reference to FIG. 3.

The bias current generator 190 may supply the bias current IB, corresponding to a compensation current IC, to a compensation element CT included in each of the unit pixels, based on the bias control signal BC and the selection control signals CS. The bias current generator 190 is described in more detail with reference to FIG. 2.

Among the above-described elements configuring the image sensing device 100, at least the pixel array 150 may be disposed in an analog region, and the compensation controller 180 and the bias current generator 190 may be disposed in a digital region. In other words, component(s) related to the unit pixels, that is, the pixel array 150, and components for removing the background light, that is, the compensation controller 180 and the bias current generator 190, may be disposed in separate non-overlapping regions. For example, the component(s) related to the unit pixels, that is, the pixel array 150, and the components for removing the background light, that is, the compensation controller 180 and the bias current generator 190, may be integrated on different chips.

Figure 2:
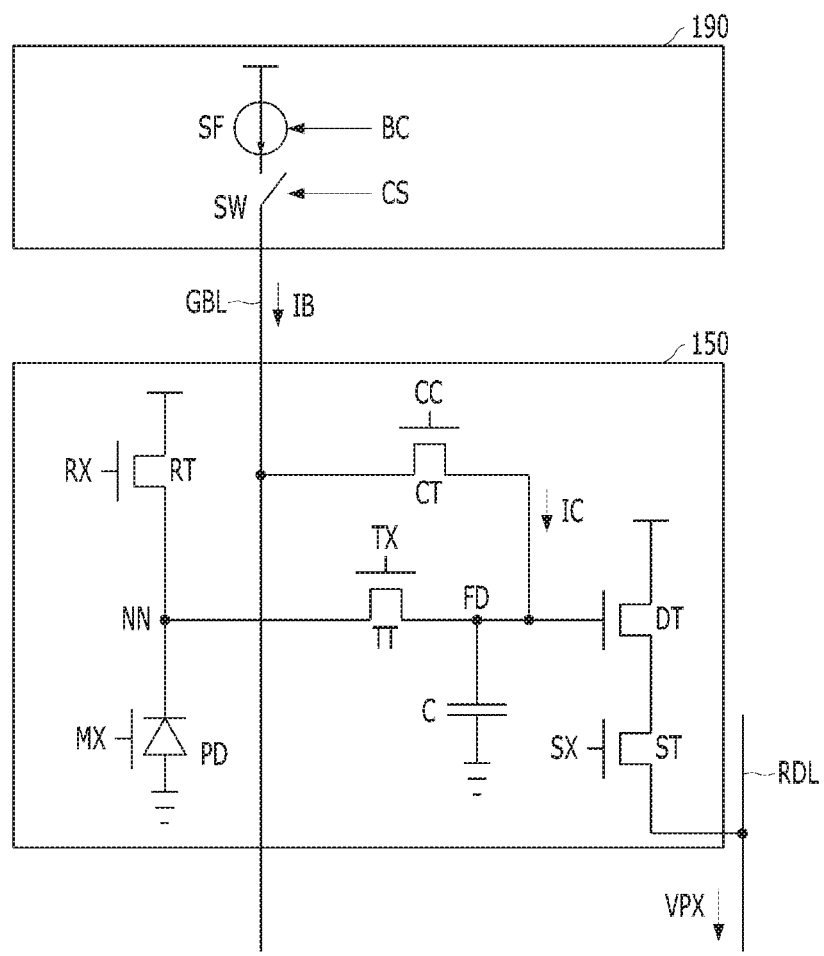
FIG. 2 is a circuit diagram illustrating examples of a pixel array and a bias current generator, such as those illustrated in FIG. 1.

FIG. 2 is a circuit diagram illustrating examples of the pixel array 150 and the bias current generator 190 illustrated in FIG. 1. It is to be noted that FIG. 2 illustrates, by way of example, only one unit pixel of the pixel array 150 and the bias current generator 190 corresponding to one column of the pixel array 150.

Referring to FIG. 2, the pixel array 150 may include the unit pixels. The unit pixels may generate the pixel signals VPX based on a reset signal RX, a transmission signal TX, a selection signal SX, the control signal MX and the compensation control signal CC. The reset signal RX, the transmission signal TX and the selection signal SX may be included in the plurality of row control signals RCTRL described above. For example, each of the unit pixels may include a charge sensing element PD, a reset element RT, a transmission element TT, a floating diffusion node FD, a compensation element CT, a driving element DT and a selection element ST.

The charge sensing element PD may be coupled between a coupling node NN and a low voltage terminal. The charge sensing element PD may generate charges corresponding to the incident light RS', based on the control signal MX during the integration time. For example, the charge sensing element PD may include photodiode.

The reset element RT may be coupled between a high voltage terminal and the coupling node NN. The reset element RT may be enabled during a reset time before the integration time based on the reset signal RX, and electrically couple the high voltage terminal to the coupling node NN. The reset element RT may reset the charge sensing element PD and the floating diffusion node FD by electrically coupling the high voltage terminal to the coupling node NN during the reset time. For example, the reset element RT may include an NMOS transistor having a gate terminal to which the reset signal RX is inputted and a source terminal and a drain terminal coupled between the high voltage terminal and the coupling node NN.

The transmission element TT may be coupled between the coupling node NN and the floating diffusion node FD. The transmission element TT may be enabled during the reset time and the integration time based on the transmission signal TX, and electrically couple the coupling node NN to the floating diffusion node FD. The transmission element TT may provide an environment in which the floating diffusion node FD can be reset, by electrically coupling the coupling node NN to the floating diffusion node FD during the reset time, and transmit the charges, which are generated from the charge sensing element PD, to the floating diffusion node FD by electrically coupling the coupling node NN to the floating diffusion node FD during the integration time. For example, the transmission element TT may include an NMOS transistor having a gate terminal to which the transmission signal TX is inputted and a source terminal and a drain terminal coupled between the coupling node NN and the floating diffusion node FD.

The floating diffusion node FD may accumulate the charges, which are generated from the charge sensing element PD, during the integration time. More specifically, the charges may be accumulated in a parasitic capacitor C coupled to the floating diffusion node FD.

The compensation element CT may be coupled between the floating diffusion node FD and a global bias line GBL. The compensation element CT may be enabled during the integration time based on the compensation control signal CC, and electrically couple the floating diffusion node FD to the global bias line GBL. The compensation element CT may supply the compensation current IC, which corresponds to the background light, to the floating diffusion node FD by electrically coupling the floating diffusion node FD to the global bias line GBL during the integration time. For example, the compensation element CT may include an NMOS transistor having a gate terminal to which the compensation control signal CC is inputted and a source terminal and a drain terminal coupled between the floating diffusion node NN and the global bias line GBL.

The driving element DT may be coupled between the high voltage terminal and the selection element ST. The driving element DT may drive a readout line RDL with a high voltage, which is supplied through the high voltage terminal, based on a voltage loaded on the floating diffusion node FD. For example, the driving element DT may include an NMOS transistor having a gate terminal coupled to the floating diffusion node FD and a source terminal and a drain terminal coupled between the high voltage terminal and the selection element ST.

The selection element ST may be coupled between the driving element DT and the readout line RDL. The selection element ST may be enabled during a readout time after the integration time based on the selection signal SX, and electrically couple the driving element DT and the readout line RDL. The selection element ST may output the pixel signal VPX, which corresponds to the voltage loaded on the floating diffusion node FD, to the signal converter 160 through the readout line RDL during the readout time. For example, the selection element ST may include an NMOS transistor having a gate terminal to which the selection signal SX is inputted and a source terminal and a drain terminal coupled between the driving element DT and the readout line RDL.

The bias current generator 190 may include a current source SF and a switch SW.

The current source SF may be coupled between the high voltage terminal and the switch SW. The current source SF may generate the bias current IB based on the bias control signal BC.

The switch SW may be coupled between the current source SF and the global bias line GBL. The switch SW may supply the bias current IB to the compensation element CT by selectively coupling the current source SF to the global bias line GBL based on the selection control signal CS.

Figure 3:
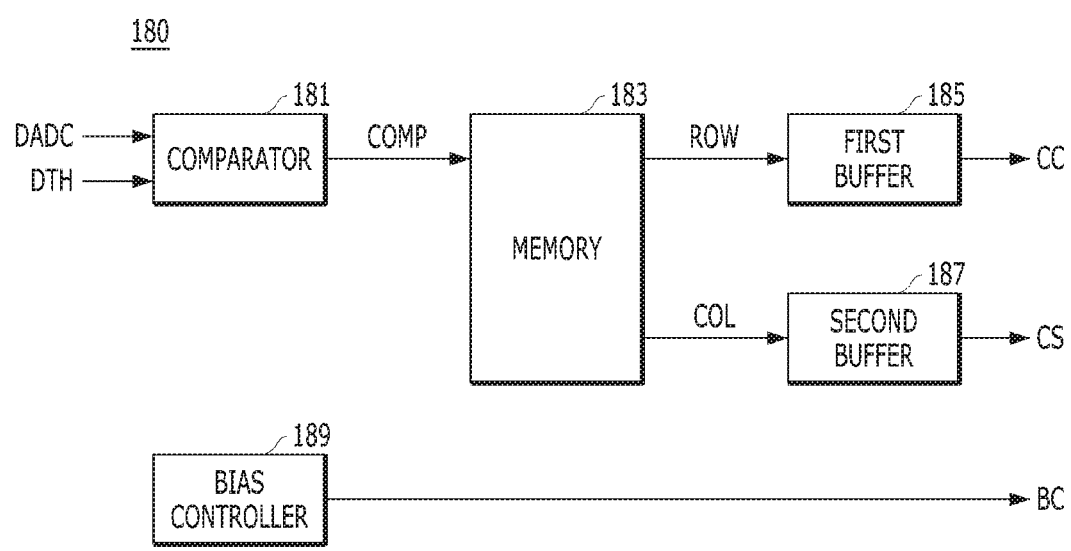
FIG. 3 is a block diagram illustrating a compensation controller, such as that illustrated in FIG. 1.

FIG. 3 is a block diagram illustrating the compensation controller 180 illustrated in FIG. 1.

Referring to FIG. 3, the compensation controller 180 may include a plurality of comparators 181, a memory 183, a plurality of first buffers 185, a plurality of second buffers 187 and a bias controller 189.

The plurality of comparators 181 may compare the plurality of pixel signals DADC respectively with a reference signal DTH, and generate a plurality of comparison signals COMP corresponding to the comparison results. For example, when the corresponding pixel signal DADC is equal to or greater than the reference signal DTH (that is, DADC≥DTH), the corresponding comparator 181 may generate the comparison signal COMP having a logic low level, i.e., "0". A case where the pixel signal DADC is equal to or greater than the reference signal DTH (that is, DADC≥DTH) may indicate that the corresponding unit pixel is not saturated. On the contrary, when the corresponding pixel signal DADC is smaller than the reference signal DTH (that is, DADC<DTH), the corresponding comparator 181 may generate the comparison signal COMP having a logic high level, i.e., "1". A case where the pixel signal DADC is smaller than the reference signal DTH (that is, DADC<DTH) may indicate that the corresponding unit pixel is saturated. For example, the number of comparators 181 provided may correspond to the number of columns of the pixel array 150.

The memory 183 may store the plurality of comparison signals COMP for the respective unit pixels. That is, the memory 183 may store each of the comparison signals COMP as compensation information corresponding to whether the corresponding unit pixel is saturated. For example, the memory 183 may include a plurality of memory cells respectively corresponding to the plurality of unit pixels. The plurality of memory cells may store each of the comparison signals COMP. The memory 183 may store the plurality of comparison signals COMP during the previous frame period, and generate a plurality of first and second selection information signals ROW and COL, corresponding to the plurality of comparison signals COMP, during the current frame period.

The plurality of first buffers 185 may buffer the plurality of first selection information signals ROW, and generate the plurality of compensation control signals CC. For example, the number of first buffers 185 provided may correspond to the number of unit pixels.

The plurality of second buffers 187 may buffer the plurality of second selection information signals COL, and generate the plurality of selection control signals CS. For example, the number of second buffers 187 provided may correspond to the number of columns of the pixel array 150.

The bias controller 189 may generate the bias control signal BC. For example, the bias controller 189 may generate the bias control signal BC according to a compensation value corresponding to the background light. The bias controller 189 may statically generate the bias control signal BC according to a predetermined compensation value during an initial operation of the image sensing device 100, or dynamically generate the bias control signal BC according to a compensation value changed in real time during a normal operation of the image sensing device 100.

Hereinafter, an operation of the image sensing device 100 in accordance with an embodiment, which has the above-described configuration, is described.

Figure 4:
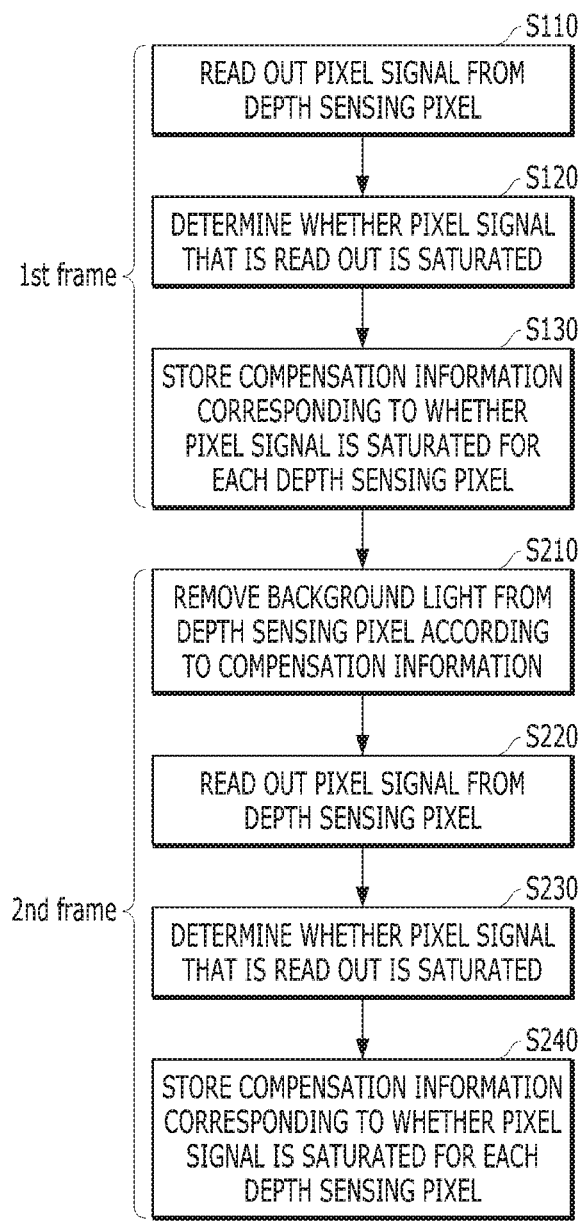
FIG. 4 is a flowchart illustrating operation of an image sensing device, such as that illustrated in FIG. 1.

FIG. 4 is a flowchart illustrating operation of the image sensing device 100 illustrated in FIG. 1.

Referring to FIG. 4, during a first frame period, the image sensing device 100 may store the plurality of compensation information (i.e., the comparison signals COMP) indicating whether each of the unit pixels is saturated, based on the plurality of pixel signals VPX which are read out from the plurality of unit pixels, that is, the depth sensing pixels. During a second frame period, the image sensing device 100 may remove the background light from the saturated unit pixels based on the plurality of compensation information, and measure the depth based on the plurality of pixel signals VPX which are read out from the plurality of unit pixels.

First, the operation of the image sensing device 100 during the first frame period is described in more detail. The description is based on the assumption that the comparison signals COMP having logic low levels indicating that the plurality of unit pixels are unsaturated are stored in the plurality of memory cells in the memory 183 during the first frame period.

During a first reset time, the plurality of unit pixels in the pixel array 150 may be reset. For example, the plurality of unit pixels may remove unnecessarily remaining charges during the first reset time. During a first integration time, each of the plurality of unit pixels may accumulate charges. For example, each of the unit pixels may accumulate the charges in its own floating diffusion node FD. During a first readout time, the plurality of unit pixels may output the plurality of pixel signals VPX to the signal converter 160, in step S110. For example, each of the unit pixels may output each of the pixel signals VPX through the readout line RDL based on the voltage loaded on its own floating diffusion node FD.

During the first readout time, the signal converter 160 may convert the plurality of analog pixel signals VPX into the plurality of digital pixel signals DADC. During the first readout time, the image processor 170 may measure the depth, which corresponds to the first frame period, based on the plurality of pixel signals DADC. During the first readout time, the compensation controller 180 may determine whether the plurality of pixel signals VPX are saturated, in step S120, and store the plurality of compensation information, which correspond to whether the plurality of pixel signals VPX are saturated, in the memory 183, in step S130. A process of determining whether each of the pixel signals VPX is saturated may include determining whether each of the unit pixels is saturated, by comparing the digital pixel signals VPX with a reference signal.

Next, the operation of the image sensing device 100 during the second frame period is described in more detail.

During a second reset time, the plurality of unit pixels in the pixel array 150 may be reset. For example, the plurality of unit pixels may remove unnecessarily remaining charges during the second reset time. During a second integration time, each of the plurality of unit pixels may accumulate charges. For example, each of the unit pixels may accumulate the charges in its own floating diffusion node FD. When the compensation controller 180 generates the plurality of selection control signals CS and the plurality of compensation control signals CC based on the compensation information, background light may be removed from a saturated unit pixel of the plurality of unit pixels, in step S210. For example, the compensation element CT in the saturated unit pixel may be enabled, and supply the compensation current IC, corresponding to the background light, to the floating diffusion node FD in the saturated unit pixel. Accordingly, charges, corresponding to the background light, among the charges accumulated in the floating diffusion node FD in the saturated unit pixel may be offset. For example, positive charges corresponding to the background light are injected into the floating diffusion node FD, whereby negative charges, corresponding to the background light, among negative charges accumulated in the floating diffusion node FD may be offset. Alternatively, the negative charges, corresponding to the background light, among the negative charges accumulated in the floating diffusion node FD may be offset by being released.

During a second readout time, the plurality of unit pixels may output the plurality of pixel signals VPX to the signal converter 160, in step S220. For example, each of the unit pixels may output each of the pixel signals VPX through each of the readout lines RDL based on the voltage loaded on its own floating diffusion node FD.

During the second readout time, the signal converter 160 may convert the plurality of analog pixel signals VPS into the plurality of digital pixel signals DADC. During the second readout time, the image processor 170 may measure the depth, which corresponds to the second frame period, based on the plurality of pixel signals DADC. Since the plurality of pixel signals DADC are in a state in which the background light is removed, the image processor 170 may accurately measure the depth. In addition, during the second readout time, the compensation controller 180 may determine whether the plurality of pixel signals VPX are saturated, in step S230, and store, that is, over-write or re-write, the plurality of compensation information, which correspond to whether the plurality of pixel signals VPX are saturated, in the memory 183, in step S240.

Figure 5:
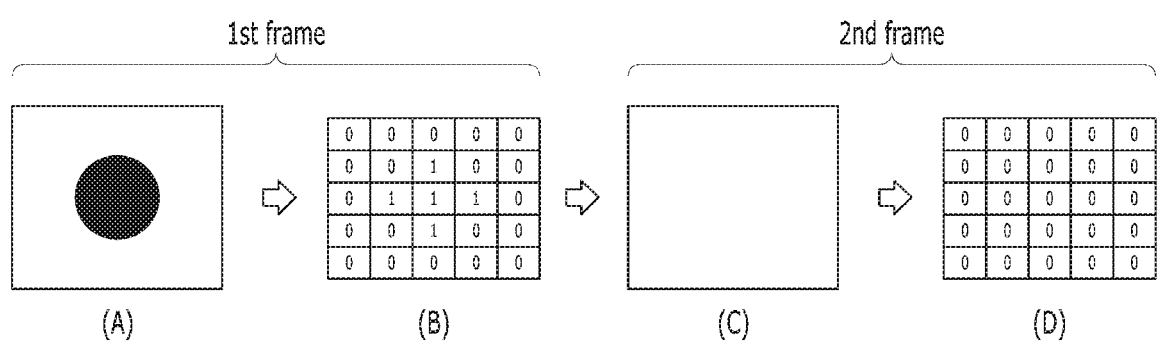
FIG. 5 is a diagram additionally illustrating operation of an image sensing device, such as that illustrated in FIG. 4.

FIG. 5 is a diagram additionally illustrating operation of the image sensing device 100 illustrated in FIG. 4.

Referring to FIG. 5, during the first frame period, unit pixels determined to be saturated are represented by black in "(A)", and the comparison signals COMP having a logic high level, i.e., "1", corresponding to the saturated unit pixels may be stored as the compensation information. Also, the comparison signals COMP having a logic low level, i.e., "0", corresponding to unsaturated unit pixels may be stored as the compensation information, as illustrated in "(B)".

During the second frame period, when a result of determining whether the plurality of unit pixels are saturated in the state in which the background light is removed indicates that none of the unit pixels is saturated as illustrated in "(C)", the comparison signals COMP having the logic low level, i.e., "0", corresponding to the unsaturated unit pixels may be stored, that is, over-written or re-written, as the compensation information, as illustrated in "(D)".

According to embodiments of the present disclosure, only a compensation element is used for removing a background light in a pixel, thereby easily removing the background light while minimizing design complexity and the area occupied by the circuit for removing the background light.

According to embodiments of the present disclosure, depth information can be accurately obtained by removing the background light.

In addition, according to embodiments of the present disclosure, the circuit for removing the background light is, to the extent possible, disposed away from a region in which the pixel is disposed, thereby minimizing the effect on pitch of the pixel.

While the present disclosure has been illustrated and described with respect to specific embodiments, the disclosed embodiments are provided by way of example; they are not intended to be restrictive. Further, it is noted that the present invention may be achieved in various ways through substitution, change, and modification that fall within the scope of the following claims, as those skilled in the art will recognize in light of the present disclosure.

What is claimed is:

1. An image sensing device comprising:
   a charge sensing circuit configured to generate first charges, which correspond to incident light, based on a photo control signal;
   a reset circuit configured to reset the charge sensing circuit based on a reset signal;
   a floating diffusion node configured to accumulate the first charges;
   a compensation circuit configured to selectively couple the floating diffusion node to a global bias line based on a compensation control signal and selectively supply a compensation current to the floating diffusion node based on the compensation control signal; and
   a selection circuit configured to output a pixel signal, which corresponds to a voltage on the floating diffusion node, to a readout line based on a selection signal.

2. The image sensing device of claim 1, wherein the compensation control signal indicates whether the floating diffusion node is saturated.

3. The image sensing device of claim 1, further comprising:
   a signal converting circuit configured to convert the pixel signal, as an analog signal, into a digital pixel signal; and
   a compensation control circuit configured to generate the compensation control signal based on the digital pixel signal.

4. The image sensing device of claim 3, wherein the compensation control circuit generates the compensation control signal for compensating for a pixel signal to be generated during a current frame period, based on the digital pixel signal generated during a previous frame period.

5. The image sensing device of claim 3, wherein the compensation control circuit includes:
   a comparator configured to compare the digital pixel signal with a reference signal;
   a memory configured to store a comparison signal outputted from the comparator, and generate first and second selection information signals corresponding to the comparison signal;
   a first buffer configured to buffer the first selection information signal, and generate the compensation control signal;
   a second buffer configured to buffer the second selection information signal, and generate a selection control signal; and
   a bias controller configured to generate a bias control signal.

6. The image sensing device of claim 5, further comprising:
   a bias current generating circuit configured to supply a bias current, which corresponds to the compensation current, to the compensation circuit based on the bias control signal and the selection control signal.

7. The image sensing device of claim 6, wherein the bias current generating circuit includes:
   a current source circuit configured to generate the bias current based on the bias control signal; and
   a switch configured to selectively couple the current source to the compensation circuit based on the selection control signal.

8. The image sensing device of claim 3,
   wherein the charge sensing circuit, the floating diffusion node, the compensation circuit and the selection circuit are disposed in an analog region, and
   wherein the compensation control circuit is disposed in a digital region.

9. An image sensing device comprising:
   at least one pixel configured to generate an analog pixel signal, which corresponds to reflected light that remains after background light of incident light is removed, based on a compensation control signal, the reflected light being reflected from a subject;
   a signal converting circuit configured to convert the analog pixel signal into a digital pixel signal; and
   a compensation control circuit configured to compare the digital pixel signal with a reference signal, store a comparison signal corresponding to the comparison result, and generate the compensation control signal corresponding to the comparison signal.

10. The image sensing device of claim 9, wherein the pixel includes:
- a charge sensing circuit configured to generate first charges, which correspond to the incident light, based on a photo control signal;
- a floating diffusion node configured to accumulate the first charges;
- a compensation circuit configured to supply selectively a compensation current, which corresponds to the background light, to the floating diffusion node based on a compensation control signal; and
- a selection circuit configured to output a pixel signal, which corresponds to a voltage on the floating diffusion node, to a readout line based on a selection signal.

11. The image sensing device of claim 10, wherein the compensation control signal indicates whether the floating diffusion node in the pixel is saturated.

12. The image sensing device of claim 9, wherein the compensation control circuit compensates for a pixel signal to be generated during a current frame period, based on the digital pixel signal generated during a previous frame period.

13. The image sensing device of claim 9, wherein the compensation control circuit includes:
- a comparator configured to compare the digital pixel signal with the reference signal;
- a memory circuit configured to store the comparison signal outputted from the comparator for each pixel, and generate first and second selection information signals corresponding to the comparison signal;
- a first buffer configured to buffer the first selection information signal, and generate the compensation control signal;
- a second buffer configured to buffer the second selection information signal, and generate a selection control signal; and
- a bias controller configured to generate a bias control signal.

14. The image sensing device of claim 13, further comprising:
- a bias current generating circuit configured to supply a bias current, which corresponds to the compensation current, to the compensation circuit based on the bias control signal and the selection control signal.

15. The image sensing device of claim 14, wherein the bias current generating circuit includes:
- a current source configured to generate the bias current based on the bias control signal; and
- a switch configured to selectively couple the current source to the compensation circuit based on the selection control signal.

16. The image sensing device of claim 9,
wherein the pixel is disposed in an analog region, and
wherein the compensation control circuit is disposed in a digital region.

17. An operating method of an image sensing device, comprising:
- determining, during a first frame period, whether at least one depth sensing pixel is saturated, based on a pixel signal read out from the depth sensing pixel;
- storing, during the first frame period, compensation information of the depth sensing pixel determined to be saturated; and
- removing, during a second frame period after the first frame period, background light from the depth sensing pixel by supplying a compensation current, which corresponds to the background light, to a floating diffusion node in the depth sensing pixel based on the compensation information.

18. The operating method of claim 17, wherein the determining includes:
- converting the pixel signal, as an analog signal, into a digital pixel signal;
- comparing the digital pixel signal with a reference signal; and
- determining whether the depth sensing pixel is saturated, according to the comparison result.

* * * * *